United States Patent
Lin

(10) Patent No.: US 7,663,876 B2
(45) Date of Patent: Feb. 16, 2010

(54) WATER-COOLED HEAT DISSIPATION DEVICE FOR A NOTEBOOK COMPUTER

(76) Inventor: Chia-Ching Lin, P.O. Box 6-57, Junghe, Taipei (TW)

( * ) Notice: Subject to any disclaimer, the term of this patent is extended or adjusted under 35 U.S.C. 154(b) by 180 days.

(21) Appl. No.: 12/076,596

(22) Filed: Mar. 20, 2008

(65) Prior Publication Data

US 2009/0178783 A1    Jul. 16, 2009

(30) Foreign Application Priority Data

Jan. 15, 2008   (TW) .............................. 97200928 U

(51) Int. Cl.
H05K 7/20 (2006.01)
G06F 1/20 (2006.01)
G06F 1/16 (2006.01)

(52) U.S. Cl. .................... 361/679.47; 361/679.53; 361/679.55; 361/695; 361/698; 361/689

(58) Field of Classification Search ............ 361/690, 361/695, 679.53, 679.55, 698, 679.47, 687; 165/80.4; 454/184; D14/439
See application file for complete search history.

(56) References Cited

U.S. PATENT DOCUMENTS

| | | | | |
|---|---|---|---|---|
| 6,071,082 A * | 6/2000 | Lecinski et al. | ............... | 417/53 |
| 6,115,249 A * | 9/2000 | Cipolla et al. | .......... | 361/679.46 |
| 6,170,563 B1 * | 1/2001 | Hsieh | .......... | 165/122 |
| 6,239,971 B1 * | 5/2001 | Yu et al. | .......... | 361/695 |
| 6,414,842 B1 * | 7/2002 | Cipolla et al. | .......... | 361/679.46 |
| 6,466,438 B1 * | 10/2002 | Lim | .......... | 361/679.47 |
| 6,738,256 B2 * | 5/2004 | Hsieh et al. | .......... | 361/679.47 |
| D522,002 S * | 5/2006 | Cheng | .......... | D14/439 |
| 7,038,909 B1 * | 5/2006 | Chen | .......... | 361/679.48 |
| 7,177,150 B2 * | 2/2007 | Kazuhiro | .......... | 361/695 |
| D543,209 S * | 5/2007 | Bae | .......... | D14/451 |
| D554,647 S * | 11/2007 | Chan | .......... | D14/447 |
| D555,162 S * | 11/2007 | Park et al. | .......... | D14/447 |
| 7,301,765 B2 * | 11/2007 | Huang | .......... | 361/695 |
| D557,267 S * | 12/2007 | Beilstein et al. | .......... | D14/451 |
| 7,336,489 B1 * | 2/2008 | Chen et al. | .......... | 361/700 |
| D579,455 S * | 10/2008 | Chu | .......... | D14/447 |
| 7,453,694 B2 * | 11/2008 | Lee | .......... | 361/679.48 |

(Continued)

FOREIGN PATENT DOCUMENTS

JP         2002031448 A   *   1/2002

*Primary Examiner*—Anatoly Vortman
(74) *Attorney, Agent, or Firm*—Muncy, Geissler, Olds & Lowe, PLLC

(57) ABSTRACT

A water-cooled heat dissipation device for a notebook computer includes primarily a pad and a heat dissipation device at a bottom of the pad having an air through-hole. The heat dissipation structure has a fan below a U-shape plate, a groove of which is latched with parallel fins being transfixed with a metallic tube in a detouring way, with two ends of the metallic tube being connected to a water pump, allowing cooling water to circulate in the metallic tube to cool down the fins. The heat dissipation structure is fixed below the air through-hole of the pad with the two ends of the U-shape plate. In usage, a notebook computer is put on the pad, and temperature of the notebook computer is conducted to the pad. Furthermore, cold wind is blown to the pad by the fan, such that the notebook computer can be cooled down rapidly.

4 Claims, 6 Drawing Sheets

U.S. PATENT DOCUMENTS

| | | | |
|---|---|---|---|
| 2002/0186531 A1* | 12/2002 | Pokharna et al. | 361/687 |
| 2003/0058615 A1* | 3/2003 | Becker et al. | 361/687 |
| 2003/0231466 A1* | 12/2003 | Huang | 361/687 |
| 2004/0060687 A1* | 4/2004 | Moss, II | 165/80.3 |
| 2006/0232935 A1* | 10/2006 | Xiong | 361/700 |
| 2007/0097643 A1* | 5/2007 | Cheng | 361/700 |
| 2008/0037213 A1* | 2/2008 | Haren | 361/687 |
| 2009/0068910 A1* | 3/2009 | Fredrick et al. | 442/314 |
| 2009/0179131 A1* | 7/2009 | Lord et al. | 248/346.5 |
| 2009/0212180 A1* | 8/2009 | Lord | 248/176.1 |

* cited by examiner

WATER-COOLED HEAT DISSIPATION DEVICE FOR A NOTEBOOK COMPUTER

BACKGROUND OF THE INVENTION (a) Field of the Invention

The present invention relates to a water-cooled heat dissipation device for a notebook computer, and more particularly to a heat dissipation device which enables cooling water to circulate in a connected metallic tube for cooling down fins by an operation of a water pump, such that air blown out by a fan can form as cold wind through the fins to blow toward a pad, thereby dissipating heat rapidly.

(b) Description of the Prior Art

Due to the advanced development of semi-conductor technology, a notebook computer is becoming more and more compact for facilitating carrying. However, larger heat is also resulted. In particular, when the notebook computer has been used for a long time or when multiple application programs are executing at a same time in the notebook computer, temperature inside the computer will continue to rise up following the time of usage, and sometimes can even reach more than 70°. Although a heat dissipation device is also provided inside the computer, a heat dissipation effect is not significant due to a limitation of space.

Accordingly, there are vendors who have continuously developed multiple kinds of heat dissipation products for the notebook computers to improve the heat dissipation effect. For example, a heat dissipation pad made totally by a metallic heat conductive material is used to conduct high temperature of a casing of the notebook computer, or the notebook computer is put on a casing of a heat dissipation pad, with an interior of the casing being provided with a fan, such that the temperature in the casing of the notebook computer can be reduced by air convection.

Nevertheless, when practically using the aforementioned heat dissipation products, following shortcomings are available: (1) upon using the heat dissipation pad made totally by the metallic heat conductive material, although the temperature generated by the notebook computer can be effectively conducted to the pad, a heat deposition phenomenon will be resulted when time goes by, and therefore, a heat dissipation function will be lost; (2) the fan-type heat dissipation pad uses the air convection to reduce the temperature, yet the heat conductivity of the air is only 0.024 W/m° C., and hence the real heat dissipation effect is limited.

SUMMARY OF THE INVENTION

Accordingly, the primary object of the present invention is to provide a water-cooled heat dissipation device for a notebook computer for effectively solving the shortcomings of the conventional heat dissipation device.

Accordingly, the present invention uses the following technology.

The aforementioned water-cooled heat dissipation device for a notebook computer includes a pad and a heat dissipation structure provided at a bottom of the pad, wherein a surface of the pad is provided with an air through-hole, and the heat dissipation structure is provided with a fan which is fixed below a U-shape plate having a ventilation hole, with a groove of the U-shape plate being latched with a plurality of parallel fins, the fins being transfixed with a metallic tube in a detouring way, and two ends of the tube being connected respectively to an inlet and an outlet of a water pump, such that cooling water can circulate in the metallic tube. In addition, the heat dissipation structure is fixed below the air through-hole of the pad with the two ends of the U-shape plate. While in usage, a notebook computer is put on the pad, allowing heat generated by the notebook computer to be conducted toward the pad, and enabling cooling water to circulate in the metallic tube to cool down the fins by an operation of the water pump, such that air blown out by the fan can form as cold wind through the fins to blow toward the pad, thereby rapidly cooling down the notebook computer.

In the aforementioned water-cooled heat dissipation device for a notebook computer, the pad is made by aluminum or other heat conductive material.

In the aforementioned water-cooled heat dissipation device for a notebook computer, a rear edge of the pad is provided with a USB (Universal Serial Bus) socket which is connected to the fan and the water pump for connecting to the notebook computer, such that power can be supplied to the fan and the water pump from the notebook computer.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
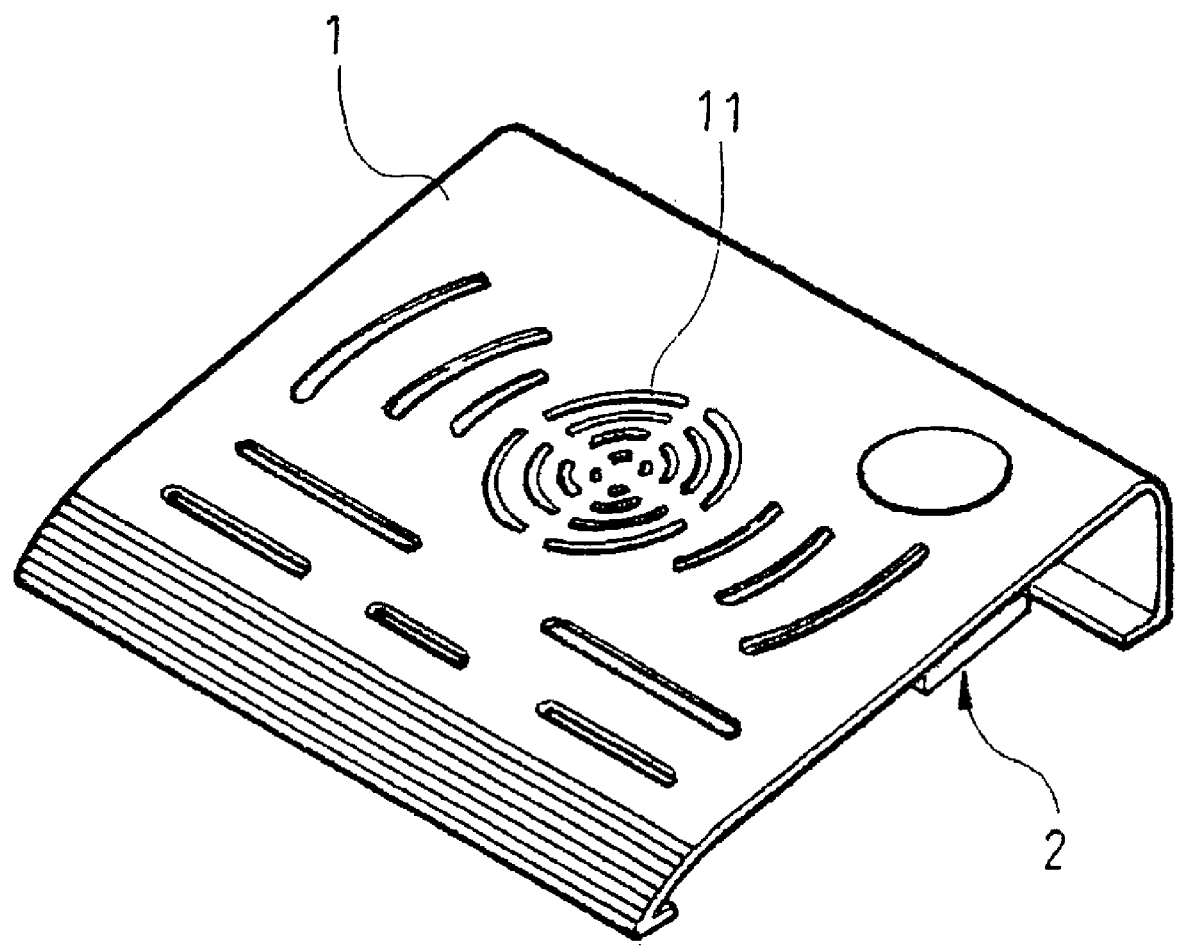
FIG. 1 shows a perspective view the present invention.
Figure 2:
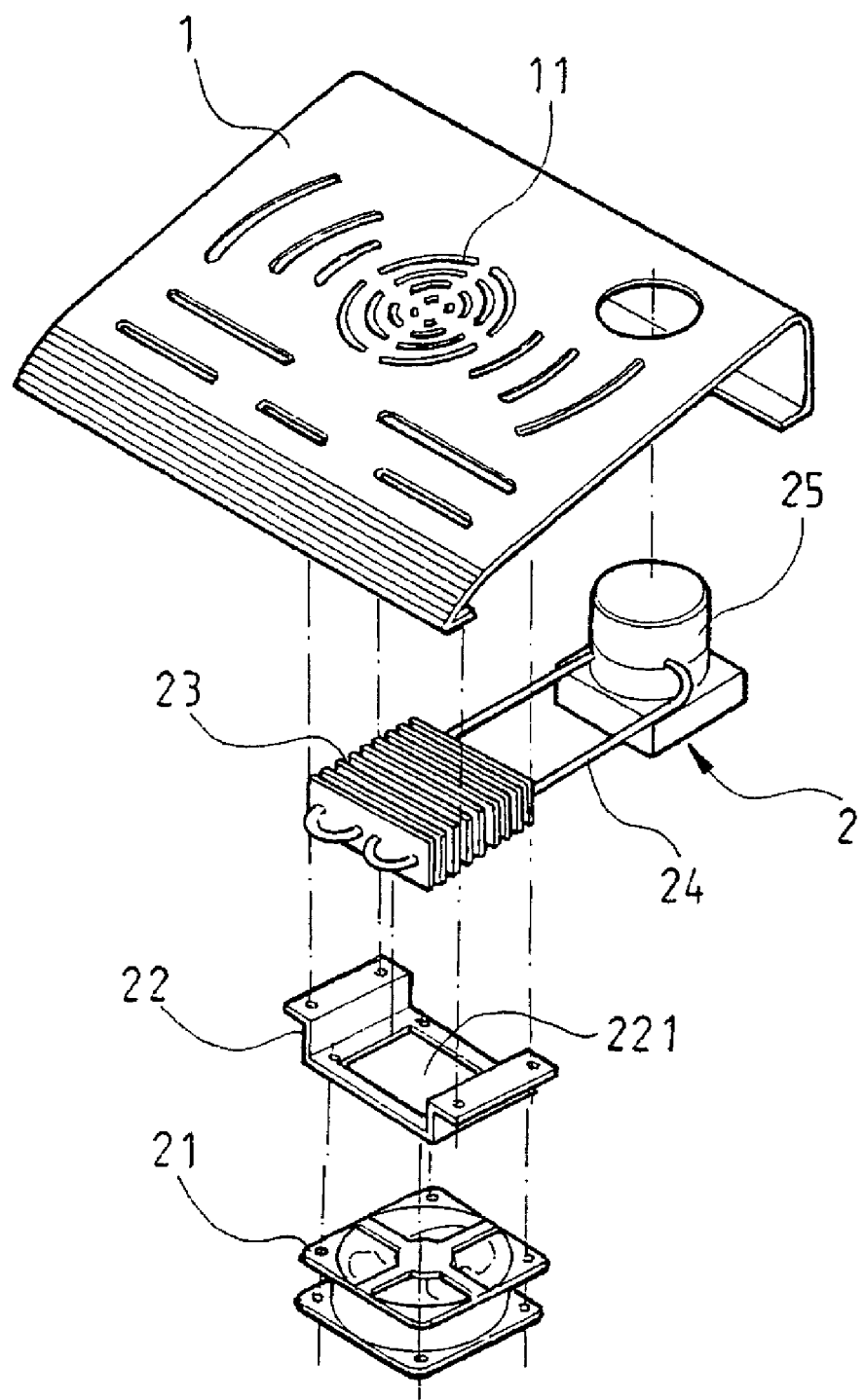
FIG. 2 shows an exploded view of the present invention.
Figure 3:
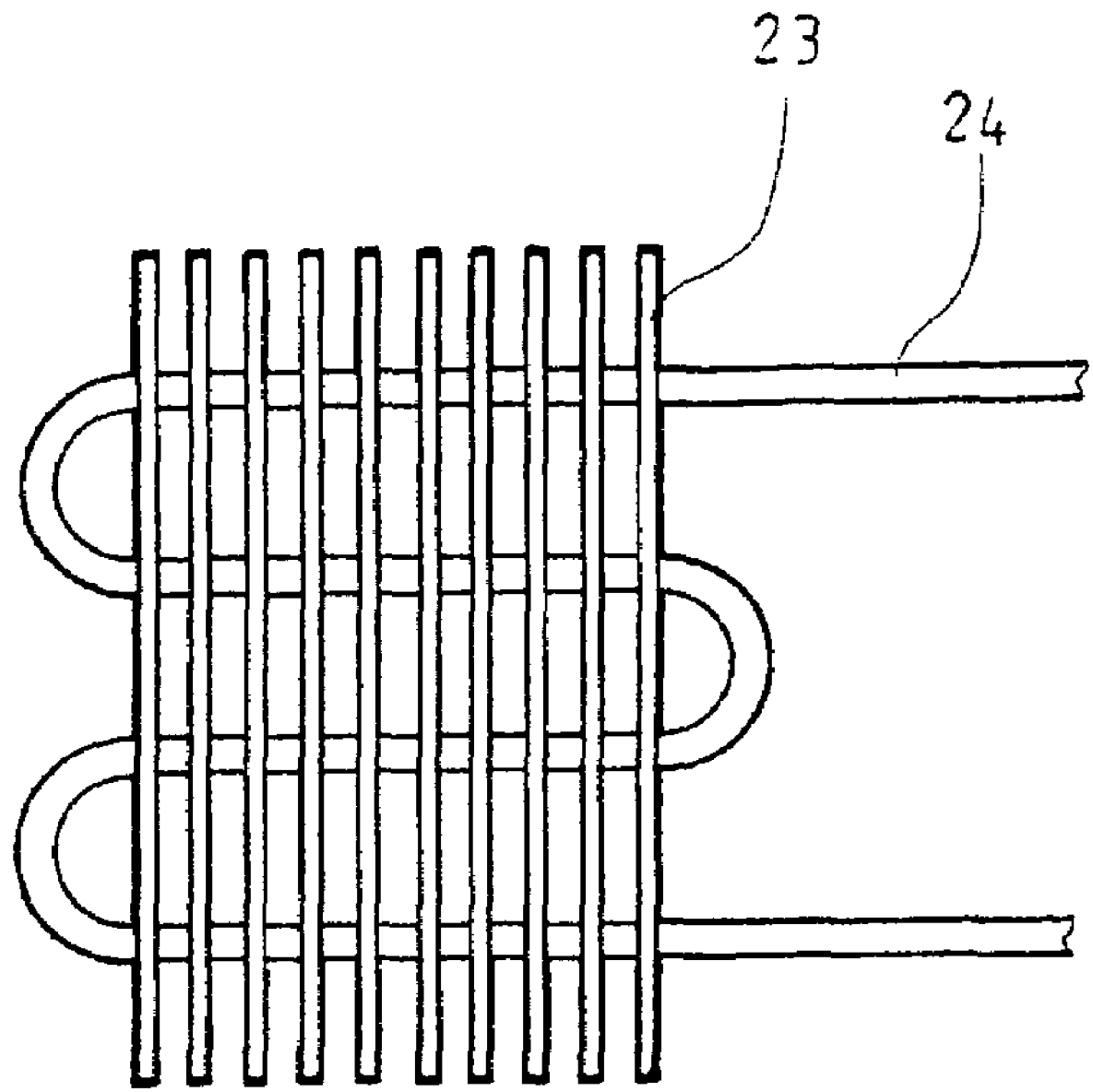
FIG. 3 shows a schematic view of implementing an assembly of cooling fins and a metallic tube of the present invention.

Referring to FIG. 1 and FIG. 2 at a same time, in association with FIG. 3, the present invention comprises primarily a pad 1 which is made by aluminum or other heat conductive material, and a heat dissipation structure 2 which is provided at a bottom of the pad 1, wherein a proper position on a surface of the pad 1 is provided with an air through-hole 11, the heat dissipation structure 2 is provided with a fan 21 which is locked and fixed below a U-shape plate 22 having a ventilation hole 221, with a groove of the U-shape plate 22 being latched with fins 23 formed by laying out a plurality of sheets, the fins 23 being transfixed with a metallic tube 24, and two ends of the metallic tube 24 being connected respectively to a water pump 25. One end of the metallic tube 24 is connected to an outlet of the water pump 25, and the other end is bended repeatedly and transfixed into the fins 23 to be connected back to an inlet of the water pump 25.

By assembling the aforementioned parts, the two ends of the U-shape plate 22 are fixed below the air through-hole 11 of the pad 1 to constitute a heat dissipation device, such that when a notebook computer is put on the pad 1, heat generated by the notebook computer can be conducted to the pad 1, and water can flow in the metallic tube 24 by an operation of the water pump 25 to cool down the fins 23, further enabling air blown out by the fan 21 to form a cold wind through the ventilation hole 221 of the U-shape plate 22 and the fins 23, thereby rapidly cooling down the notebook computer.

Figure 4:
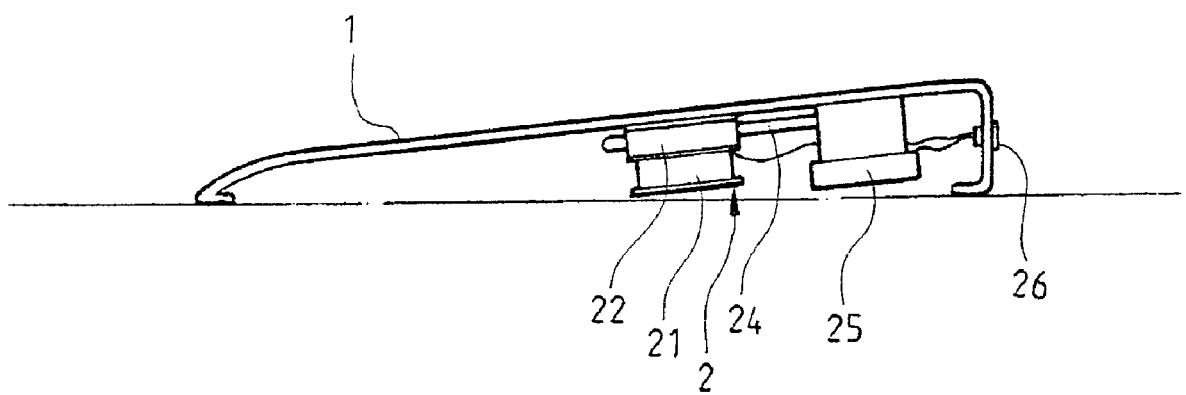
FIG. 4 shows a schematic view of implementing an assembly of the present invention.

Referring to FIG. 4, a rear side of the pad 1 is a vertical surface which is provided with a USB socket 26 for connecting to the fan 21 and the water pump 25, such that the USB socket 26 can be connected to the notebook computer by a lead wire, enabling power to be supplied to the fan 21 and the water pump 25 from the notebook computer.

Figure 5:
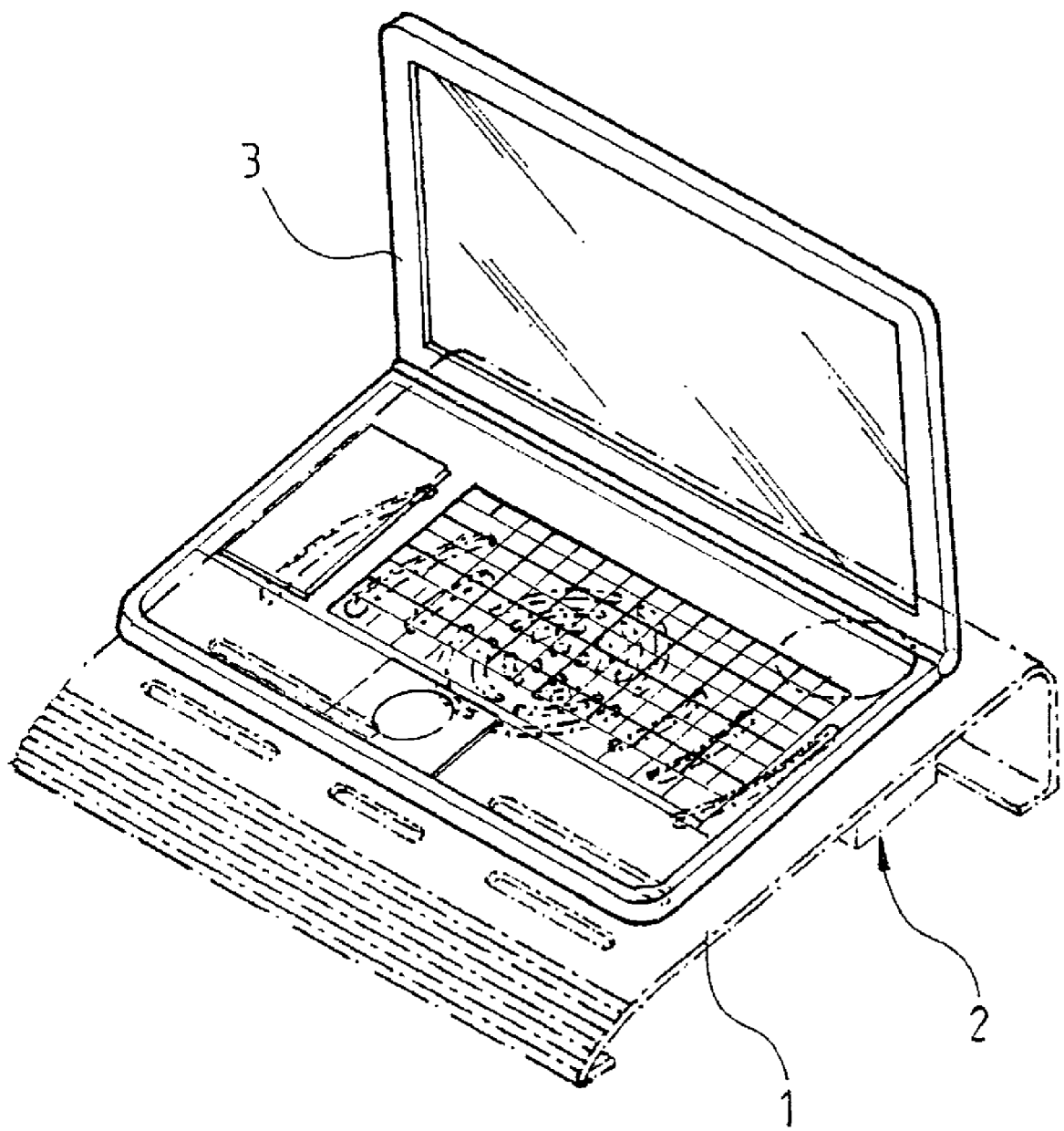
FIG. 5 shows a schematic view of using the present invention.
Figure 6:
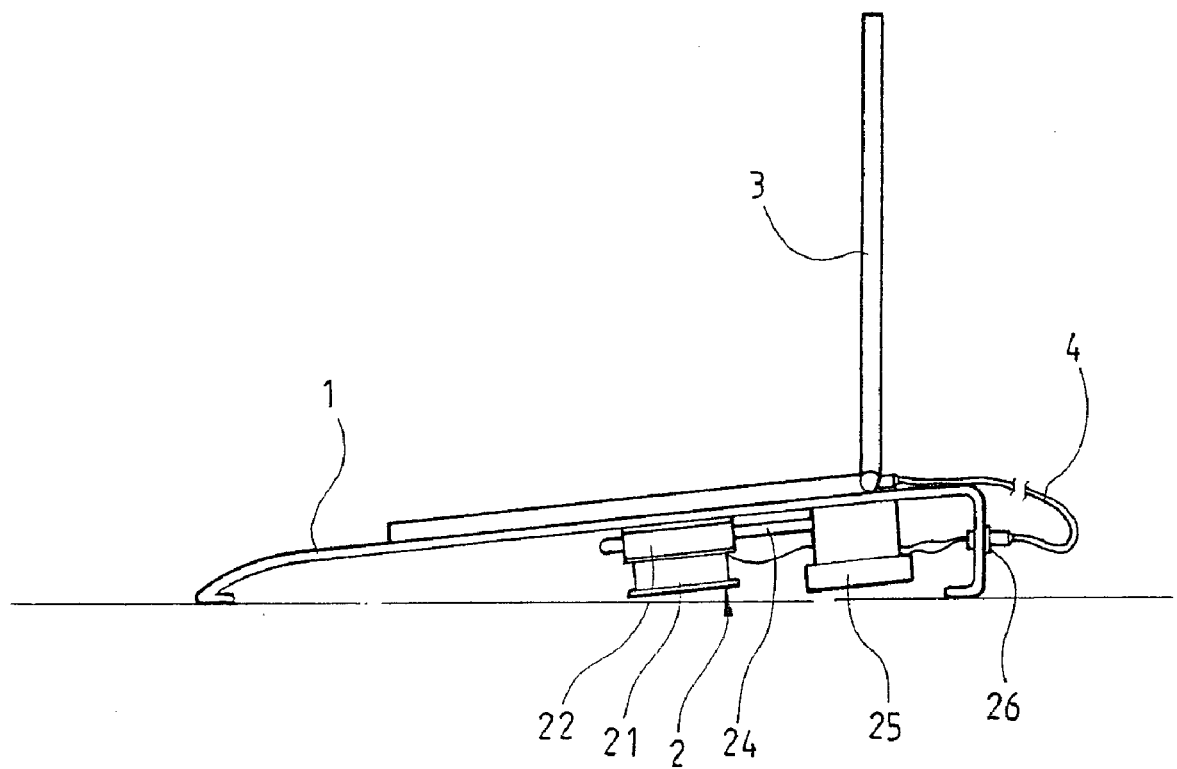
FIG. 6 shows another schematic view of using the present invention.

Referring to FIG. 5 and FIG. 6 at a same time, while in usage, a notebook computer 3 is put on the pad 1, and then a lead wire 4 is inserted into the notebook computer 3 and the USB socket 26, such that power can be supplied to the fan 21 and the water pump 25 from the notebook computer 3. After the notebook computer 3 has been turned on, in addition to that wind is blown upward by a rotation of the fan 21, cooling water is flowing back and forth in the metallic tube 24 by an operation of the water pump 25 to cool down the fins 23, allowing wind which is blown out by the fan 21 to form a cold wind through the fins 23 for conducting the heat generated by the notebook computer 3 to the pad 1, which achieves an effect of quick dissipation by the cold wind blown out from the air through-hole 11 of the pad 1 additionally, thereby enabling the notebook computer 3 to operate normally and preventing elements thereof such as chips to be damaged from high temperature.

Accordingly, the present invention delicately uses a function of water cooling, in association with the fins and fan, to effectively reduce the heat generated when the notebook computer is operating, thereby achieving the best heat dissipation effect.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A water-cooled heat dissipation device for a notebook computer, comprising a pad, a surface of which is provided with an air through-hole; and a heat dissipation structure which is provided with a fan, with the fan being locked and fixed below a U-shape plate having a ventilation hole, a groove of the U-shape plate being latched with a plurality of parallel fins, the fins being transfixed with a metallic tube, and two ends of the metallic tube being connected respectively to a water pump, allowing cooling water to circulate in the tube to cool down the fins; the heat dissipation structure being fixed below the air through-hole of the pad with the two ends of the U-shape plate, enabling air blown out by the fan to form a cold wind through the fins to blow toward the pad, thereby rapidly cooling down the notebook computer.

2. The water-cooled heat dissipation device for a notebook computer, according to claim 1, wherein a rear side of the pad is provided with a USB (Universal Serial Bus) socket which is connected to the fan and the water pump for connecting to the notebook computer, such that power is supplied to the fan and the water pump from the notebook computer.

3. The water-cooled heat dissipation device for a notebook computer, according to claim 1, wherein an end of the metallic tube is connected to an outlet of the water pump, and the other end is bended repeatedly and transfixed into the fins to be connected back to an inlet of the water pump.

4. The water-cooled heat dissipation device for a notebook computer, according to claim 1, wherein the pad is made by aluminum or other heat conductive material.

* * * * *